United States Patent
Ley et al.

(10) Patent No.: US 9,476,300 B2
(45) Date of Patent: Oct. 25, 2016

(54) PAN PITCH CONTROL IN A LONGWALL SHEARING SYSTEM

(71) Applicant: Joy MM Delaware, Inc., Wilmington, DE (US)

(72) Inventors: Jeffrey A. Ley, Cranberry, PA (US); Matthew Beilstein, Grove City, PA (US)

(73) Assignee: Joy MM Delaware, Inc., Wilmington, DE (US)

( * ) Notice: Subject to any disclaimer, the term of this patent is extended or adjusted under 35 U.S.C. 154(b) by 0 days.

(21) Appl. No.: 14/472,330

(22) Filed: Aug. 28, 2014

(65) Prior Publication Data

US 2016/0061031 A1    Mar. 3, 2016

(51) Int. Cl.
E21C 35/08    (2006.01)
E21C 35/24    (2006.01)
E21C 27/32    (2006.01)

(52) U.S. Cl.
CPC ............... E21C 35/24 (2013.01); E21C 27/32 (2013.01)

(58) Field of Classification Search
CPC ...................................................... E21C 35/24
See application file for complete search history.

(56) References Cited

U.S. PATENT DOCUMENTS

| | | | |
|---|---|---|---|
| 3,922,015 A | 11/1975 | Poundstone | |
| 4,008,921 A | 2/1977 | Czauderna et al. | |
| 4,023,861 A | 5/1977 | Schnell | |
| 4,079,997 A | 3/1978 | Bienko et al. | |
| 4,143,552 A | 3/1979 | Godfrey | |
| 4,192,551 A | 3/1980 | Weimer et al. | |
| 4,200,335 A | 4/1980 | Moynihan et al. | |
| 4,323,280 A | 4/1982 | Lansberry et al. | |
| 4,634,186 A * | 1/1987 | Pease | E21C 35/24 299/1.6 |
| 4,753,484 A | 6/1988 | Stolarczyk et al. | |
| 4,822,105 A | 4/1989 | Yamada et al. | |
| 5,228,751 A * | 7/1993 | Ramsden, Jr. | E21C 35/24 299/1.6 |
| 5,448,479 A | 9/1995 | Kemner et al. | |
| 5,469,356 A | 11/1995 | Hawkins et al. | |

(Continued)

FOREIGN PATENT DOCUMENTS

| | | |
|---|---|---|
| CN | 201433792 Y | 3/2010 |
| CN | 103742142 A | 4/2014 |

(Continued)

OTHER PUBLICATIONS

Search Report from the Polish Patent Office for Application No. P-413683 dated Mar. 16, 2016 (2 pages).

(Continued)

Primary Examiner — John Kreck
(74) Attorney, Agent, or Firm — Michael Best & Friedrich LLP

(57) ABSTRACT

A system and corresponding method of monitoring a longwall shearing mining machine in a longwall mining system, where the shearing mining machine includes a shearer having a cutter drum, the method includes obtaining, by a processor, desired pitch angle information, and receiving, by the processor, a pitch angle indicative of a current pitch position of the shearer. The method also includes determining, by the processor, whether the pitch angle is within a desired pitch angle range, and controlling, by the processor, a position of the cutter drum based on whether the pitch angle is within the desired pitch angle range. The desired pitch angle range is based on the desired pitch angle information.

19 Claims, 16 Drawing Sheets

(56) References Cited

U.S. PATENT DOCUMENTS

| | | |
|---|---|---|
| 5,586,030 A | 12/1996 | Kemner et al. |
| 5,615,116 A | 3/1997 | Gudat et al. |
| 5,646,845 A | 7/1997 | Gudat et al. |
| 5,648,901 A | 7/1997 | Gudat et al. |
| 5,838,562 A | 11/1998 | Gudat et al. |
| 5,877,723 A | 3/1999 | Fan |
| 5,906,646 A | 5/1999 | Kemner |
| 5,913,914 A | 6/1999 | Kemner et al. |
| 5,925,081 A | 7/1999 | Hawkins et al. |
| 5,956,250 A | 9/1999 | Gudat et al. |
| 5,961,560 A | 10/1999 | Kemner |
| 5,967,616 A | 10/1999 | Offutt et al. |
| 6,002,362 A | 12/1999 | Gudat |
| 6,132,005 A | 10/2000 | Mazlin et al. |
| 6,351,697 B1 | 2/2002 | Baker |
| 6,361,119 B1 | 3/2002 | Kussel |
| 6,393,362 B1 | 5/2002 | Burns |
| 6,442,456 B2 | 8/2002 | Burns et al. |
| 6,612,655 B2 | 9/2003 | Schwoebel et al. |
| 6,633,800 B1 | 10/2003 | Ward et al. |
| 6,666,521 B1 | 12/2003 | Pease et al. |
| 6,694,233 B1 | 2/2004 | Duff et al. |
| 6,799,100 B2 | 9/2004 | Burns et al. |
| 6,857,705 B2 * | 2/2005 | Hainsworth ............ E21C 35/08 299/1.6 |
| 7,181,370 B2 | 2/2007 | Furem et al. |
| 7,574,821 B2 | 8/2009 | Furem |
| 7,578,079 B2 | 8/2009 | Furem |
| 7,656,342 B2 | 2/2010 | Stolarczyk et al. |
| 7,659,847 B2 | 2/2010 | Bausov et al. |
| 7,695,071 B2 | 4/2010 | Jackson et al. |
| 7,725,232 B2 | 5/2010 | Mäkelä et al. |
| 7,899,599 B2 | 3/2011 | Mäkelä et al. |
| 8,157,331 B2 * | 4/2012 | Niederriter ............ E21C 35/24 299/1.6 |
| 8,376,467 B2 | 2/2013 | Junker et al. |
| 8,562,077 B2 | 10/2013 | Junker et al. |
| 8,567,870 B2 * | 10/2013 | Junker ............ E21C 35/24 299/1.7 |
| 8,708,421 B2 * | 4/2014 | Junker ............ E21C 35/24 299/1.7 |
| 2007/0216216 A1 | 9/2007 | Baird, Jr. et al. |
| 2010/0114808 A1 | 5/2010 | Mintah |
| 2010/0138094 A1 | 6/2010 | Stark et al. |
| 2011/0153541 A1 | 6/2011 | Koch et al. |
| 2012/0098325 A1 | 4/2012 | Junker et al. |
| 2012/0146387 A1 | 6/2012 | Shatters |
| 2012/0191431 A1 | 7/2012 | Dunbabin et al. |
| 2012/0305025 A1 | 12/2012 | Helbig et al. |
| 2013/0006484 A1 | 1/2013 | Avitzur et al. |

FOREIGN PATENT DOCUMENTS

| | | |
|---|---|---|
| DE | 4142165 A1 | 4/1993 |
| DE | 4234721 A1 | 4/1993 |
| DE | 4234720 A1 | 4/1994 |
| DE | 4439601 A1 | 5/1996 |
| GB | 2103265 A | 2/1983 |
| PL | 394472 A1 | 10/2012 |
| RU | 2360111 C2 | 6/2009 |
| WO | 9624753 A1 | 8/1996 |

OTHER PUBLICATIONS

Search Report from the Polish Patent Office for Application No. P-413691 dated Mar. 15, 2016 (2 pages).

Corrected Search Report from the British Patent Office for Application No. GB1514307.6 dated Feb. 18, 2016 (2 pages).

Search Report from the United Kingdom Intellectual Property Office for Application No. GB1514307.6 dated Jan. 22, 2016 (3 pages).

* cited by examiner

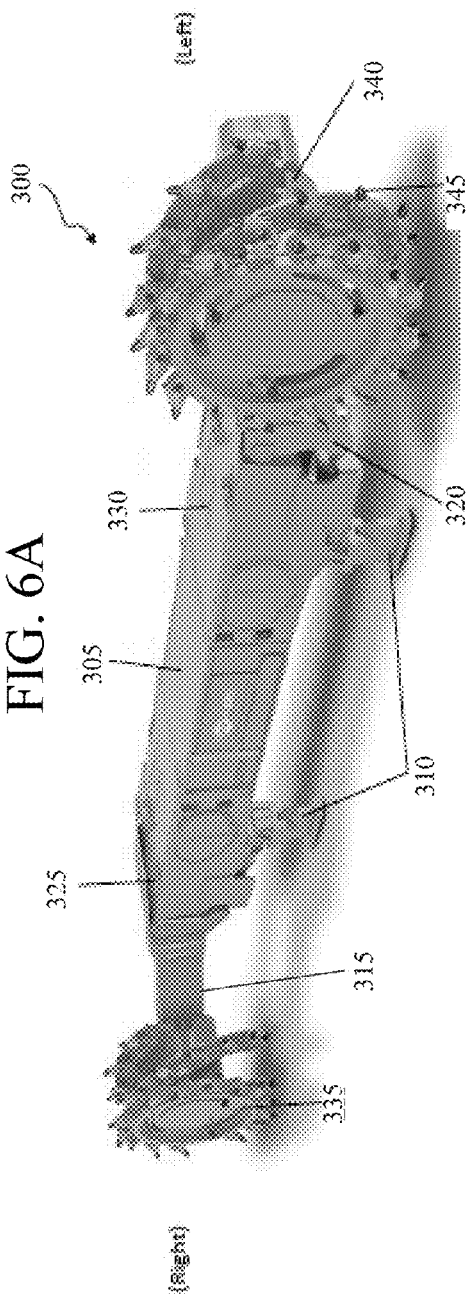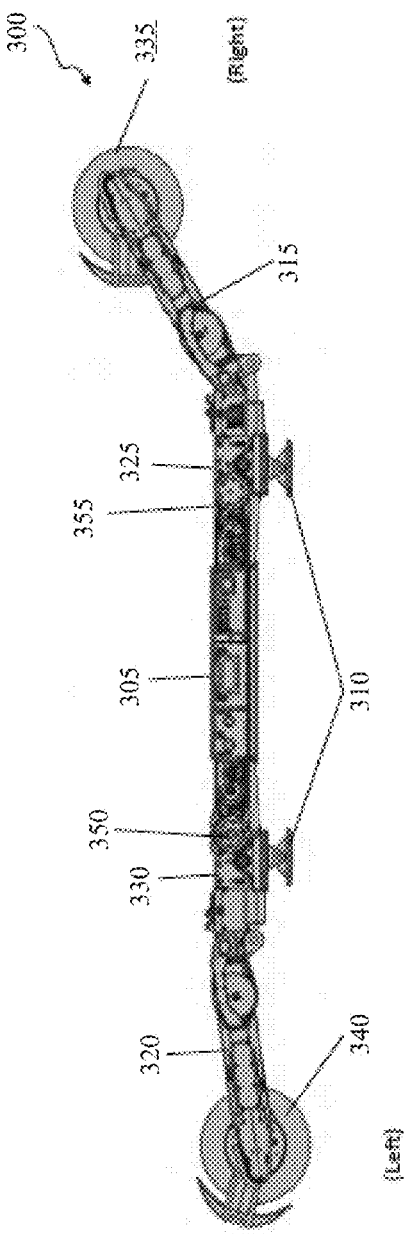
FIG. 6A
FIG. 6B

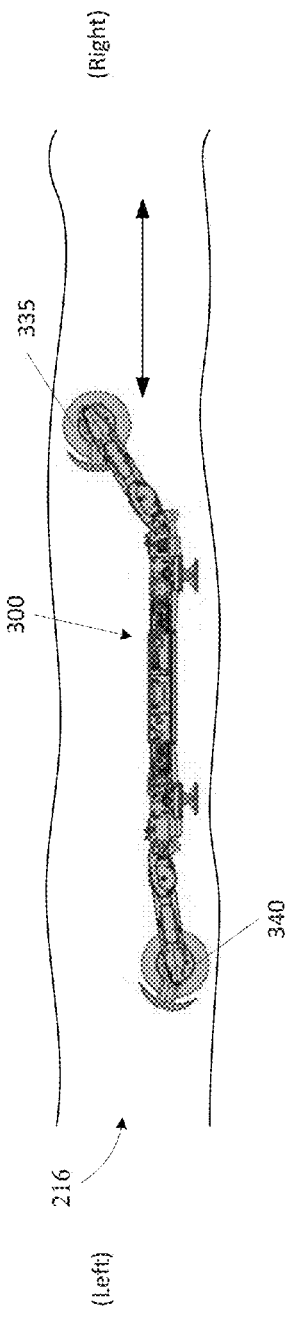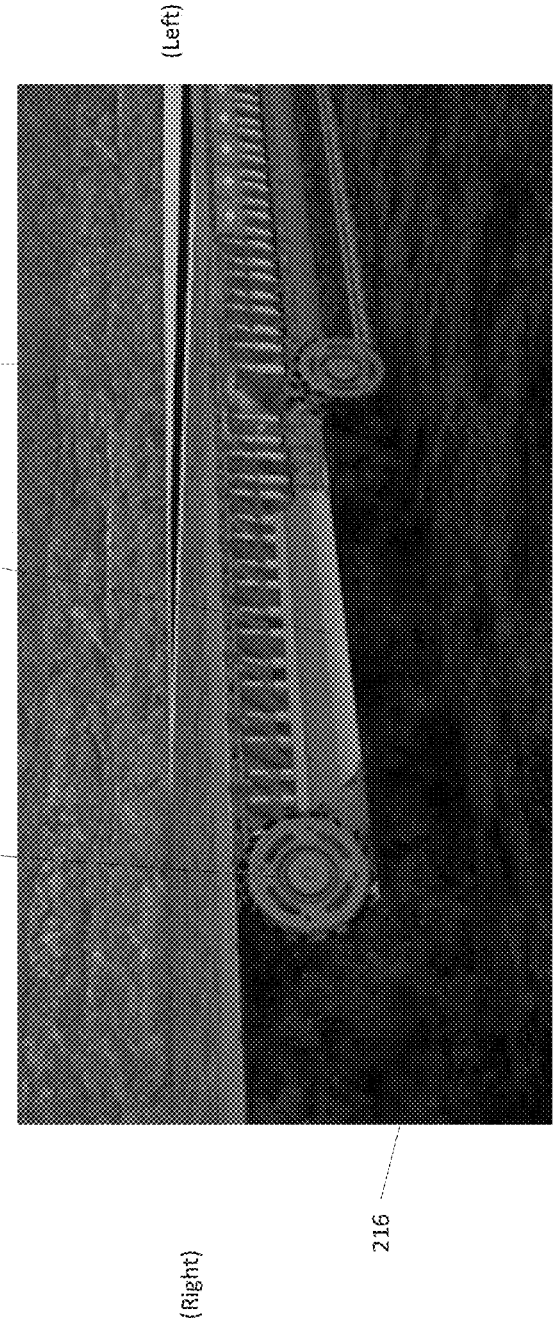
FIG. 7A
FIG. 7B

PAN PITCH CONTROL IN A LONGWALL SHEARING SYSTEM

FIELD OF INVENTION

The present invention relates to monitoring shearer position of a longwall mining system.

SUMMARY

In one embodiment, the invention provides a method of monitoring a longwall shearing mining machine in a longwall mining system. The shearing mining machine includes a shearer having a cutter drum. The method includes obtaining, by a processor, desired pitch angle information and receiving, by the processor, a pitch angle indicative of a current pitch position of the shearer. The method also includes determining, by the processor, whether the pitch angle is within a desired pitch angle range. The desired pitch angle range is based on the desired pitch angle information. The method also further includes controlling, by the processor, a position of the cutter drum based on whether the pitch angle is within the desired pitch angle range.

In another embodiment the invention provides a monitoring device for a longwall mining system including a shearer having a cutter drum and a sensor to determine a pitch position of the shearer. The monitoring device includes a monitoring module implemented on a processor in communication with the shearer to obtain desired pitch angle information and receive a pitch angle indicative of a current pitch position of the shearer. The monitoring module includes an analysis module configured to determine whether the pitch angle is within a desired pitch angle range. The pitch angle range is based on the desired pitch angle information. The monitoring module also includes a correction module that is configured to control a position of the cutter drum based on whether the pitch angle is within the desired pitch angle range.

Other aspects of the invention will become apparent by consideration of the detailed description and accompanying drawings.

BRIEF DESCRIPTION OF THE DRAWINGS

FIGS. 6A-B illustrate a longwall shearer of the longwall mining system.

FIGS. 7A-B illustrate a longwall shearer as it passes through a coal seam.

DETAILED DESCRIPTION

Figure 1:
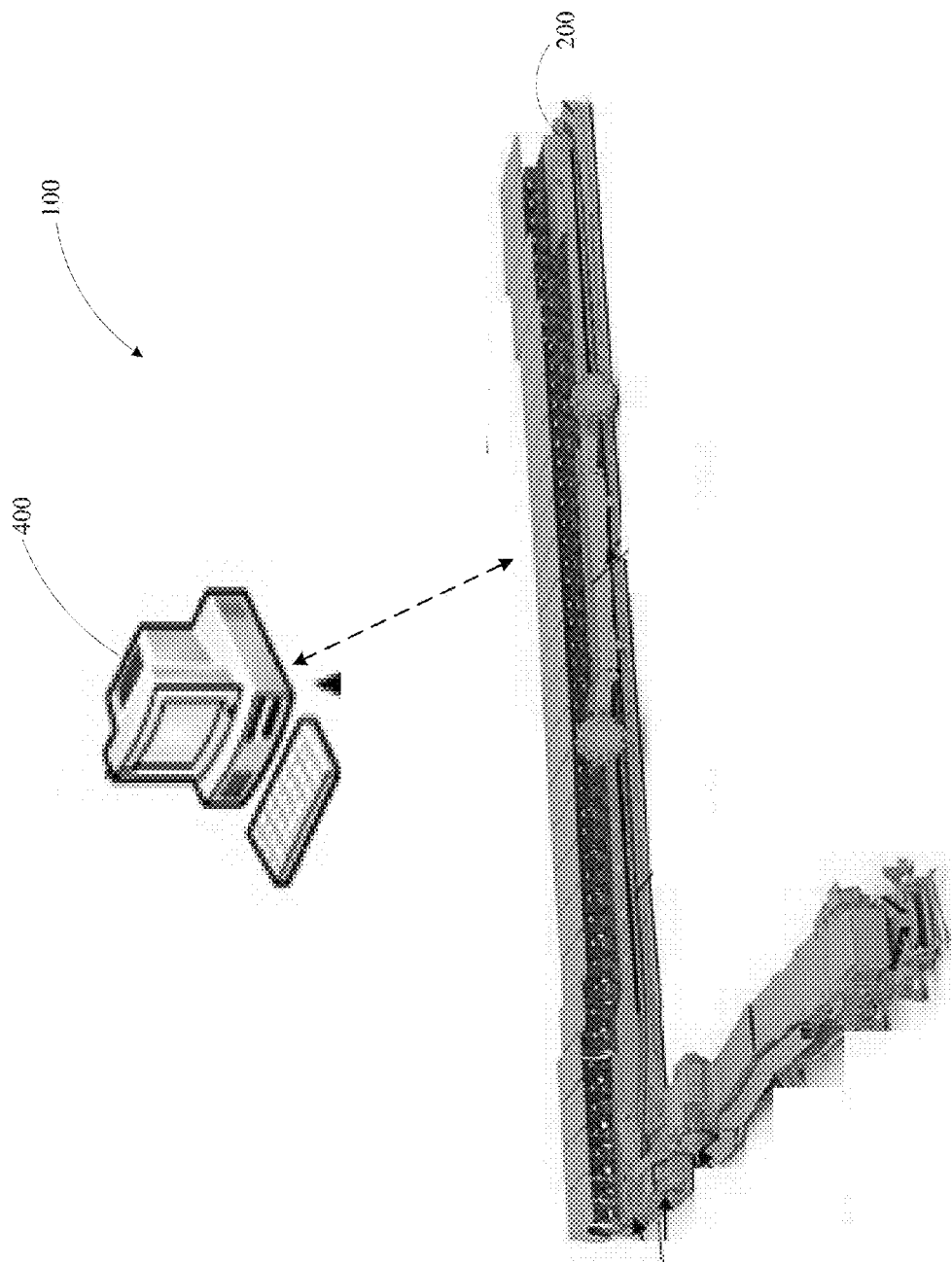
FIG. 1 is a schematic diagram of an extraction system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it would be noted that a plurality of hardware and software based devices, as well as a plurality of different structural components, may be utilized to implement the invention. Furthermore, and as described in subsequent paragraphs, the specific mechanical configurations illustrated in the drawings are intended to exemplify embodiments of the invention. However, other alternative mechanical configurations are possible. For example, "controllers" and "modules" described in the specification can include one or more processors, one or more computer-readable medium modules, one or more input/output interfaces, and various connections (e.g., a system bus) connecting the components. In some instances, the controllers and modules may be implemented as one or more of general purpose processors, digital signal processors DSPs), application specific integrated circuits (ASICs), and field programmable gate arrays (FPGAs) that execute instructions or otherwise implement their functions described herein.

FIG. 1 illustrates an extraction system 100. The extraction system 100 includes a longwall mining system 200 and a health monitoring system 400. The extraction system 100 is configured to extract an ore or a mineral, for example, coal from a mine in an efficient manner. In other embodiments, the extraction system 100 is used to extract other ores and/or minerals. For example, in some embodiments, Trona, a non-marine evaporate mineral, is extracted using a longwall mining system. The longwall mining system 200 includes tools, for example, a shearer 300, to physically extract coal, or another mineral, from an underground mine. The health monitoring system 400 monitors operation of the longwall mining system 200 to, for example, ensure that extraction of the mineral remains efficient, detect equipment problems, and the like.

Longwall mining begins with identifying a mineral seam to be extracted, then "blocking out" the seam into mineral panels by excavating roadways around the perimeter of each panel. During excavation of the seam (i.e., extraction of coal), select pillars of mineral can be left unexcavated between adjacent mineral panels to assist in supporting the overlying geological strata. The mineral panels are excavated by the longwall mining system 200, and the extracted mineral is transported to the surface of the mine.

Figure 2A:
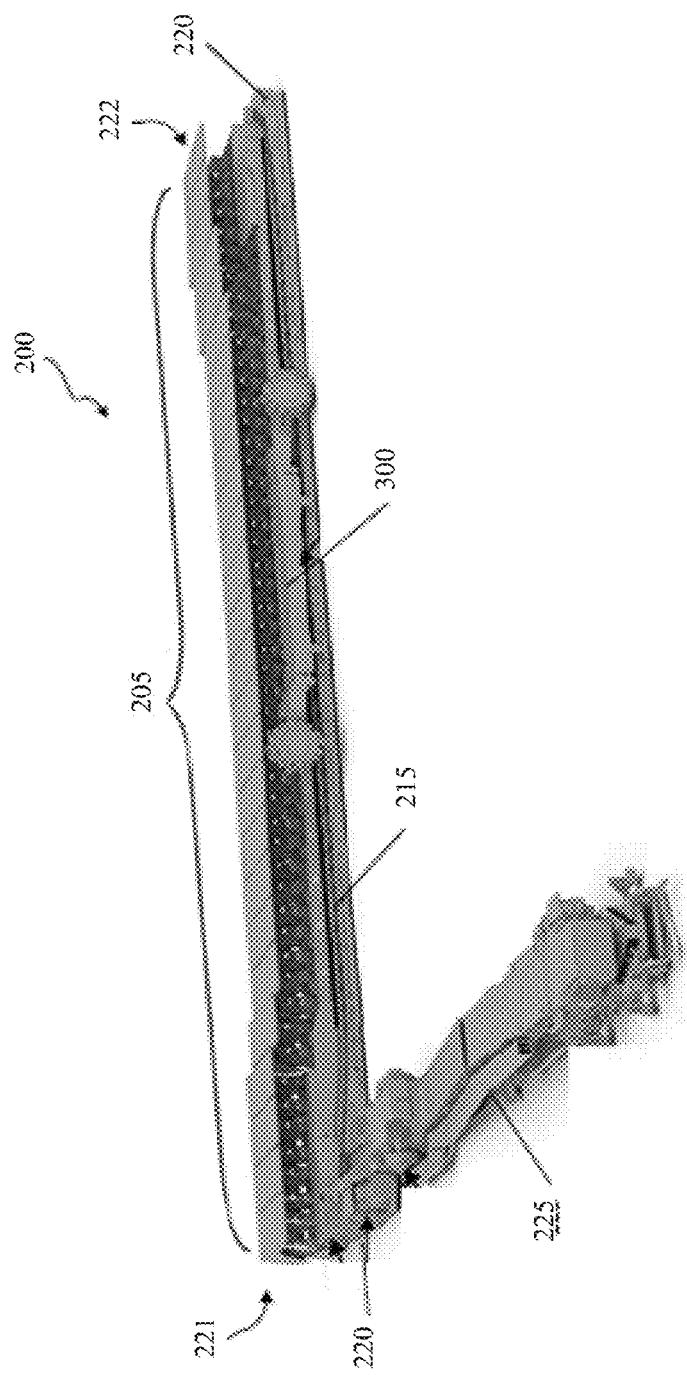
FIGS. 2A-B illustrate a longwall mining system of the extraction system of FIG. 1.
Figure 2B:
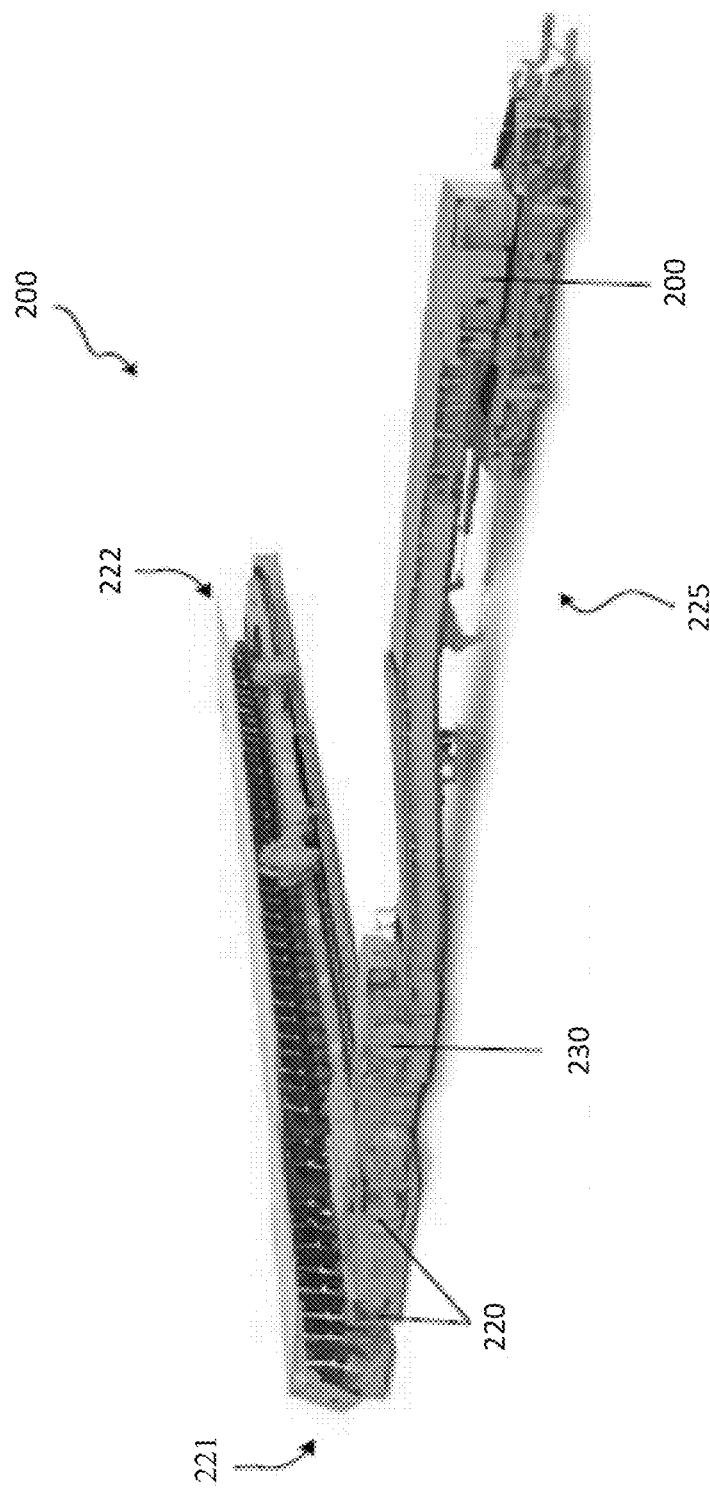

As illustrated in FIGS. 2A-2B, the longwall mining system 200 includes roof supports 205, a longwall shearer 300, and an armored face conveyor (AFC) 215. The longwall mining system 200 is generally positioned parallel to the mineral face 216 (see FIG. 3). The roof supports 205 are interconnected parallel to the mineral face 216 (see FIG. 3) by electrical and hydraulic connections. Further, the roof supports 205 shield the shearer 300 from overlying geological strata 218 (see FIG. 3). The number of roof supports 205 used in the mining system 200 depends on the width of the mineral face 216 being mined since the roof supports 205 are intended to protect the full width of the mineral face 216 from the strata 218.

The shearer 300 is propagated along the line of the mineral face 216 by the AFC 215, which includes a dedicated track for the shearer 300 running parallel to the mineral face 216. The shearer track is positioned between the mineral face 216 itself and the roof supports 205. As the shearer 300 travels the width of the mineral face 216, removing a layer of mineral, the roof supports 205 automatically advance to support the roof of the newly exposed section of strata 218.

Figure 3:
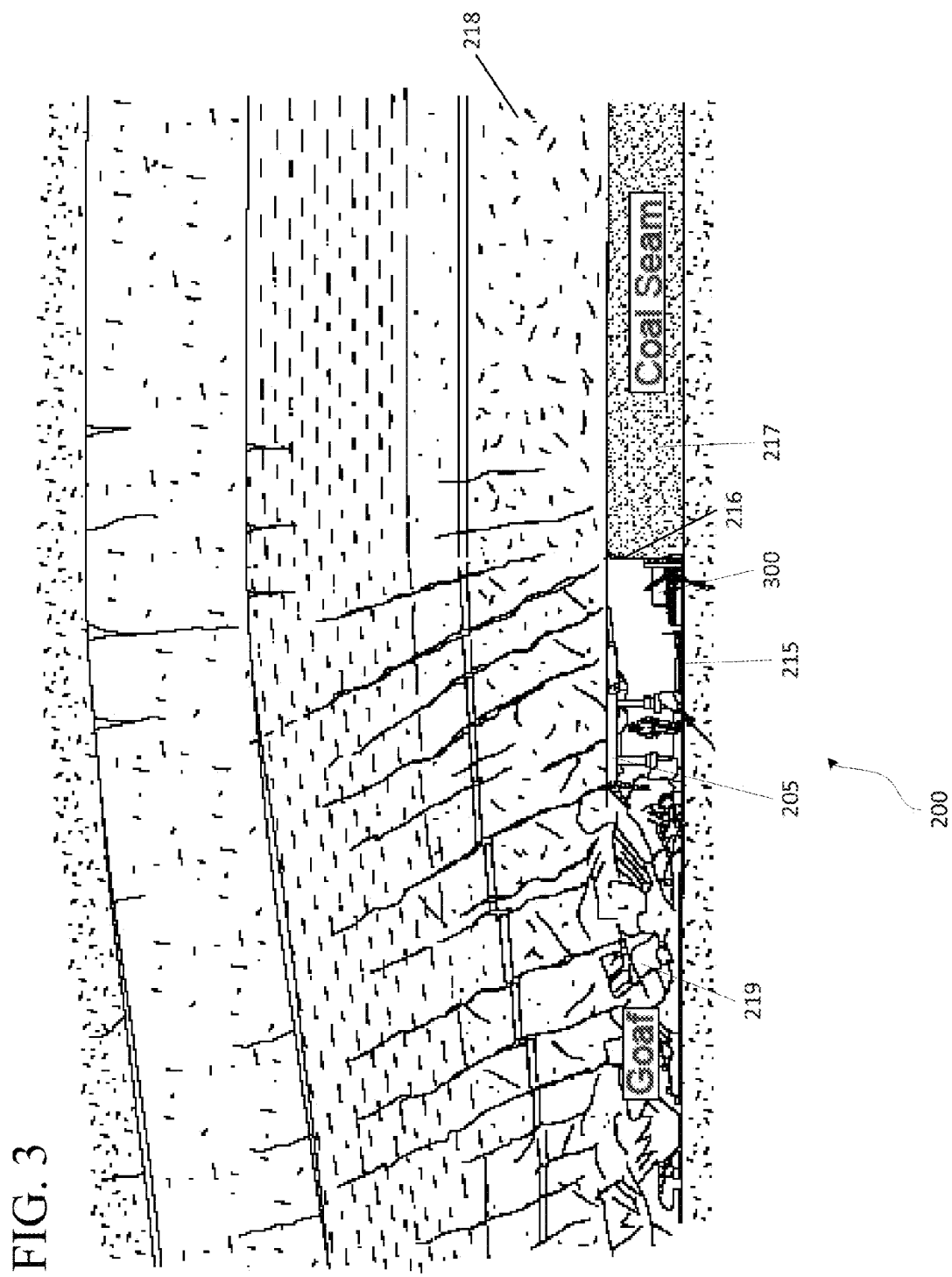
FIG. 3 illustrates collapsing of the geological strata as mineral is removed from the mineral seam.

FIG. 3 illustrates the mining system 200 advancing through the mineral seam 217 as the shearer 300 removes mineral from the mineral face 216. The mineral face 216 illustrated in FIG. 3 extends perpendicular from the plane of the figure. As the mining system 200 advances through the mineral seam 217 (to the right in FIG. 3), the strata 218 is allowed to collapse behind the mining system 200, forming a goaf 219. The mining system 200 continues to advance forward and shear more mineral until the end of the mineral seam 217 is reached.

While the shearer 300 travels along the side of the mineral face 216, extracted mineral falls onto a conveyor included in the AFC 215, parallel to the shearer track. The mineral is transported away from the mineral face 216 by the conveyor. The AFC 215 is then advanced by the roof supports 205 toward the mineral face 216 by a distance equal to the depth of the mineral layer previously removed by the shearer 300. The advancement of the AFC 215 allows the excavated mineral from the next shearer pass to fall onto the conveyor, and also allows the shearer 300 to engage with the mineral face 216 and continue shearing mineral away. The conveyor and track of the AFC 215 are driven by AFC drives 220 located at a maingate 221 and a tailgate 222, which are at distal ends of the AFC 215. The AFC drives 220 allow the conveyor to continuously transport mineral toward the maingate 221 (left side of FIG. 2A), and allows the shearer 300 to be pulled along the track of the AFC 215 bi-directionally across the mineral face 216.

The longwall mining system 200 also includes a beam stage loader (BSL) 225 arranged perpendicularly at the maingate end of the AFC 215. FIG. 2B illustrates a perspective view of the longwall mining system 200 and an expanded view of the BSL 225. When the extracted mineral hauled by the AFC 215 reaches the maingate 221, the mineral is routed through a 90° turn onto the BSL 225. In some instances, the BSL 225 interfaces with the AFC 215 at a non-right 90° angle. The BSL 225 then prepares and loads the mineral onto a maingate conveyor (not shown) which transports the mineral to the surface. The mineral is prepared to be loaded by a crusher 230, which breaks down the mineral to improve loading onto the maingate conveyor. Similar to the conveyor of the AFC 215, the conveyor of the BSL 225 is driven by a BSL drive.

Figure 4:
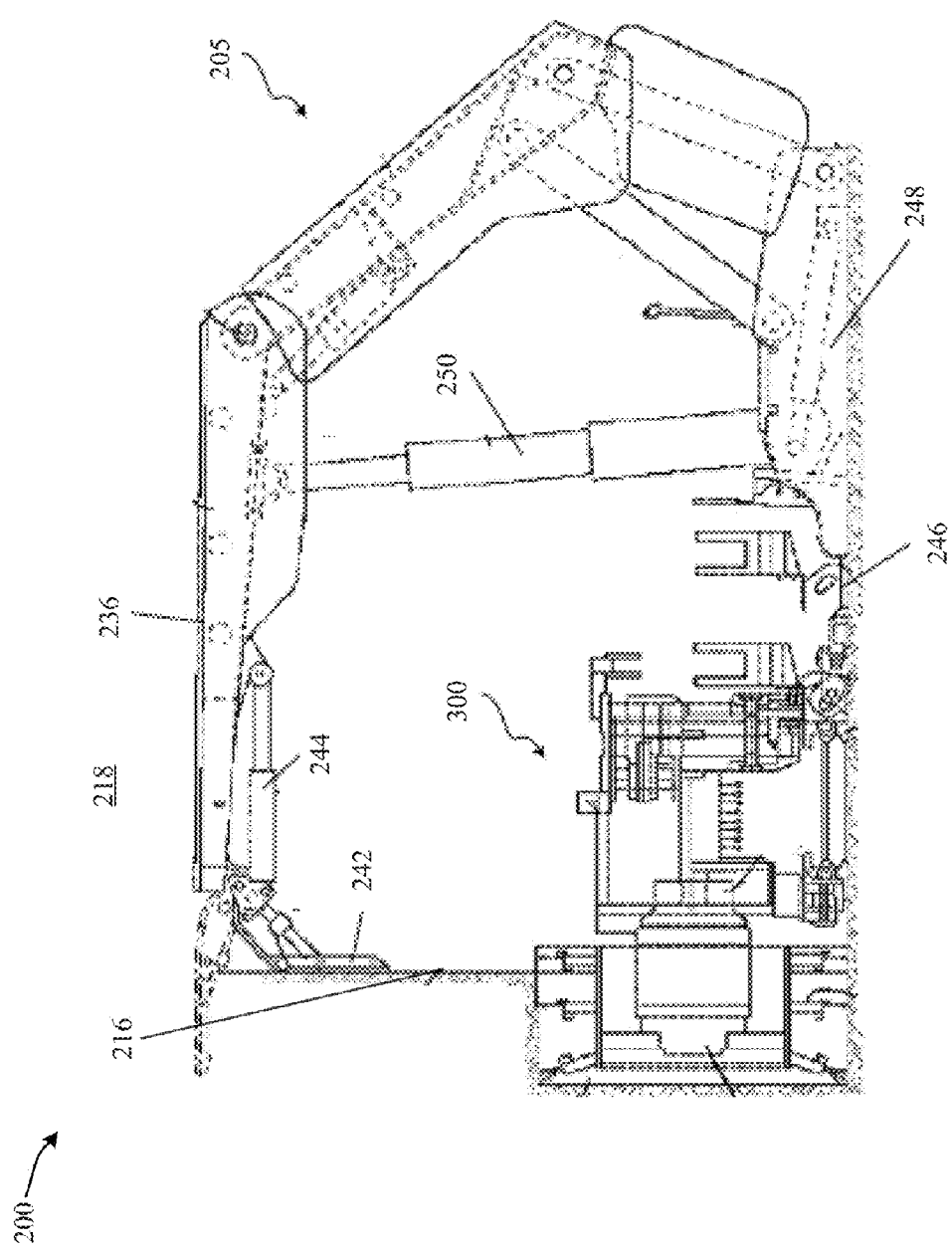
FIG. 4 illustrates a powered roof support of the longwall mining system.
Figure 5:
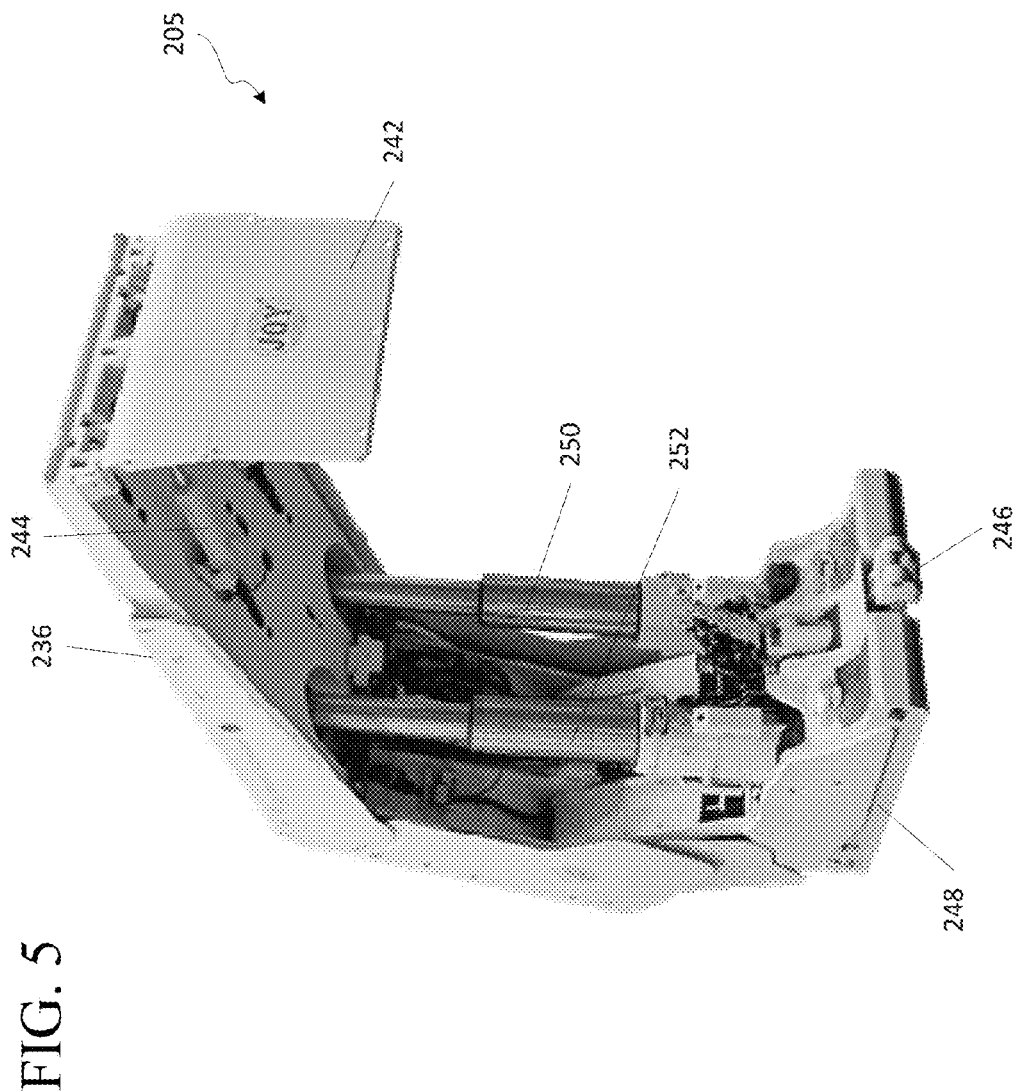
FIG. 5 illustrates another view of the roof support of the longwall mining system.

FIG. 4 illustrates the longwall mining system 200 as viewed along the line of the mineral face 216. The roof support 205 is shown shielding the shearer 300 from the overlying strata 218 by an overhanging canopy 236 of the roof support 205. The canopy 236 is vertically displaced (i.e., moved toward and away from the strata 218) by hydraulic legs 250, 252 (only one of which is shown in FIG. 4). The canopy 236 thereby exerts a range of upward forces on the geological strata 218 by applying different pressures to the hydraulic legs 250, 252. Mounted to the face end of the canopy 236 is a deflector or sprag 242, which is shown in a face-supporting position. However, the sprag 242 can also be fully extended, as shown in ghost, by a sprag arm 244. An advance ram 246 attached to a base 248 allows the roof support 205 to be pulled toward the mineral face 216 as the layers of mineral are sheared away. FIG. 5 illustrates another view of the roof support 205. FIG. 5 shows a left hydraulic leg 250 and a right hydraulic leg 252, which support the canopy 236. Both the left hydraulic leg 250 and the right hydraulic leg 252 contain pressurized fluid to support the canopy 236.

FIGS. 6A-6B illustrate the shearer 300. FIG. 6A illustrates a perspective view of the shearer 300. The shearer 300 has an elongated central housing 305 that stores the operating controls for the shearer 300. Extending below the housing 305 are skid shoes 310 that support the shearer 300 on the AFC 215. In particular, the skid shoes 310 engage the track of the AFC 215 allowing the shearer 300 to be propagated along the mineral face 216. Extending laterally from the housing 305 are left and right cutter arms 315, 320, respectively, which are movably driven by hydraulic cylinders enclosed within a right arm motor housing 325 and a left arm motor housing 330. The hydraulic cylinders are part of a right arm hydraulic system 386 configured to articulate the right cutter arm 315, and a left arm hydraulic system 388 configured to articulate the left cutter arm 320.

On the distal end of the right cutter arm 315 (with respect to the housing 305) is a right cutter 335, and on the distal end of the left cutter arm 320 is a left cutter 340. Each of the cutters 335, 340 has a plurality of mining bits 345 that abrade the mineral face 216 as the cutters 335, 340 rotate, thereby cutting away the mineral. The mining bits 345 can also spray fluid from their tips, such as, for example, for dispersing noxious and/or combustible gases that develop at the excavation site. The right cutter 335 is driven (e.g., rotated) by a right cutter motor 355 while the left cutter 340 is driven (e.g., rotated) by a left cutter motor 350. The hydraulic systems 386, 388 are configured to vertically move the right cutter arm 315 and the left cutter arm 320, respectively, which changes the vertical position of the right cutter 335 and the left cutter 340, respectively.

The vertical positions of the cutters 335, 340 are a function of the angle of the arms 315, 320 with respect to the main housing 305. Varying the angle of the cutter arms 315, 320 with respect to the main housing 305 increases or decreases the vertical position of the cutters 335, 340 accordingly. For example, when the left cutter arm 320 is raised to 20° from the horizontal, the cutter 340 may experience a positive change of vertical position of, for example, 0.5 m, while when the left cutter arm 320 is lowered to −20° from the horizontal, the left cutter 340 may experience a negative change of vertical position of, for example, −0.5 m. Therefore, the vertical position of the cutters 335, 340 may be measured and controlled based on the angle of the cutter arms 315, 320 with respect to the horizontal. FIG. 6B illustrates a side view of the shearer 300 including the cutters 335, 340; cutter arms 315, 320; skid shoes 310, and housing 305. FIG. 6B also shows detail of a left arm motor 350 and right arm motor 355, which are enclosed by the left arm motor housing 330 and right arm motor housing 325, respectively.

The shearer 300 is displaced laterally along the mineral face 216 in a bidirectional manner, though it is not necessary that the shearer 300 cut mineral bi-directionally. For example, in some mining operations, the shearer 300 is capable of being pulled bi-directionally along the mineral face 216, but only shears mineral when traveling in one direction. For example, the shearer 300 may be operated to cut mineral over the course of a first, forward pass over the width of the mineral face 216, but not cut mineral on its returning pass. Alternatively, the shearer 300 can be configured to cut mineral during both the forward and return passes, thereby performing a bi-directional cutting operation. FIGS. 7A-7B illustrate the longwall shearer 300 as it passes over the mineral face 216 from a face-end view. As shown in FIGS. 7A-7B, the left cutter 340 and the right cutter 335 are staggered to increase the area of the mineral face 216 being cut in each pass of the shearer. In particular, as the shearer 300 is displaced horizontally along the AFC 215, the left cutter 340 is shown shearing mineral away from the lower half (e.g., a lower portion) of the mineral face 216 and may be referred to as a floor cutter herein, while the right cutter 335 is shown shearing mineral away from the upper half (e.g., upper portion) of the mineral face 216. The right cutter may be referred to as a roof cutter herein. It should be understood that in some embodiments, the left cutter 340 cuts the upper portion of the mineral face 216 while the right cutter 335 cuts the lower portion of the mineral face 216.

Figure 8:
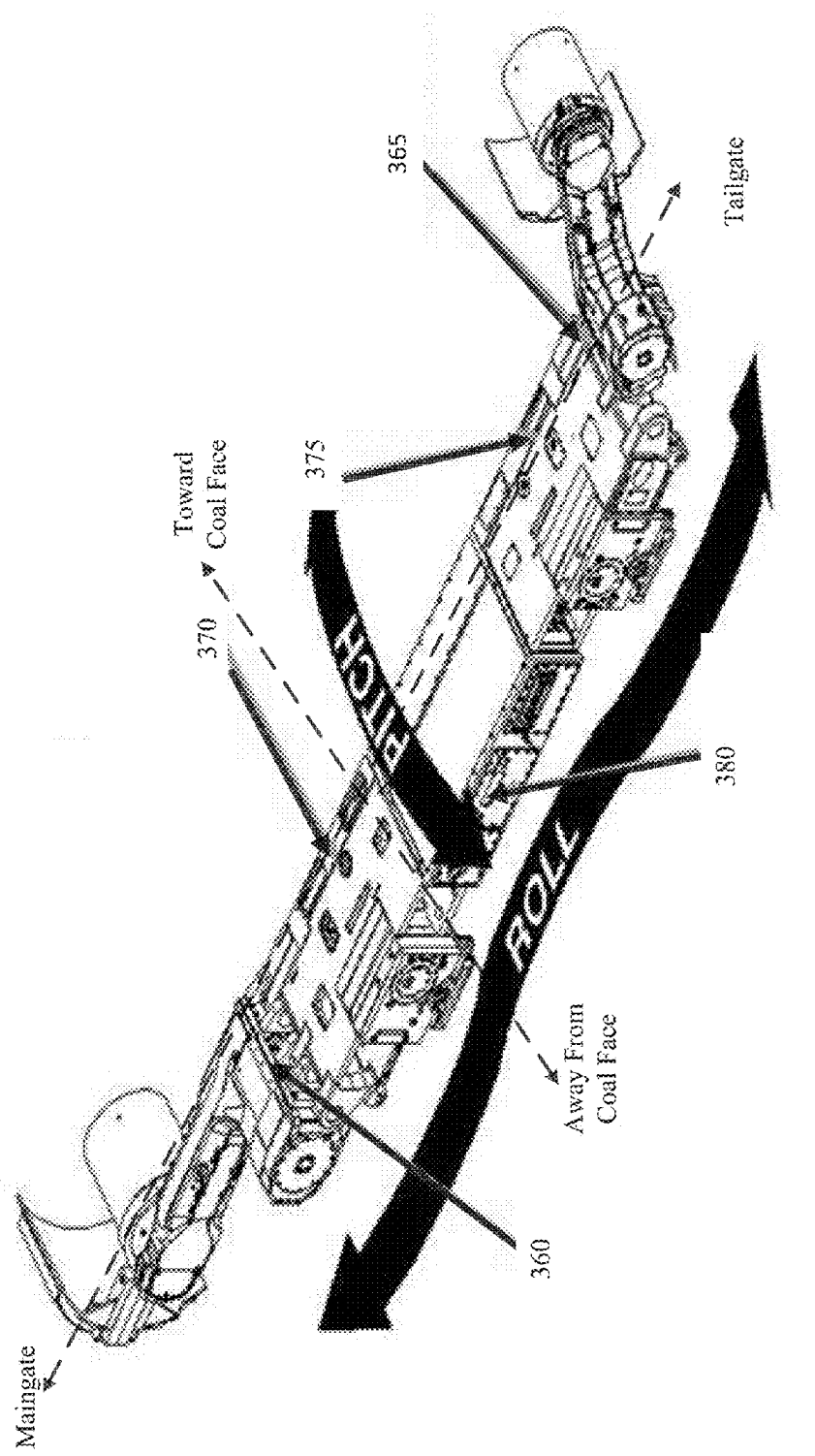
FIG. 8 illustrates approximate locations for sensors positioned in the shearer of the longwall mining system.

The shearer 300 also includes a controller 384 and various sensors, to enable automatic control of the shearer 300. For example, the shearer 300 includes a left ranging arm angle sensor 360, a right ranging arm angle sensor 365, left haulage gear sensors 370, right haulage gear sensors 375, and a pitch and roll sensor 380. FIG. 8 shows the approximate locations of these sensors, although in some embodiments the sensors are positioned elsewhere in the shearer 300. The angle sensors 360, 365 provide information regarding an angle of slope of the cutter arms 315, 320. Thus, a relative position of the right cutter 335 and the left cutter 340 can be estimated using the information from the angle sensors 360, 365 in combination with, for example, known dimensions of the shearer 300 (e.g., length of cutter arm 315). The haulage gear sensors 370, 375 provide information regarding the position of the shearer 310 as well as speed and direction of movement of the shearer 300. The pitch and roll sensor 380 provides information regarding the angular alignment of the shearer 300.

As shown in FIG. 8, the pitch of the shearer 300 refers to an angular tilting toward and away from the mineral face 216. Positive pitch refers to the shearer 300 tilting away from the mineral face 216 (i.e., when the face side of the shearer 300 is higher than the goaf side of the shearer 300), while negative pitch refers to the shearer 300 tilting toward the mineral face 216 (i.e., when the face side of the shearer 300 is lower than the goaf side of the shearer 300). The pitch position of the shearer 300 is affected by the position of the AFC 215. Since the AFC 215 advances forward after each shearer pass, the pitch angle of the shearer 300 is determined, at least in part, by the ground line generated with the extraction of mineral (i.e., by the roof cutter 335 and the floor cutter 340) and on which the AFC 215 rests. In other words, when the shearer 300 is propelled forward across the mineral face 216 and extracts the mineral, the floor cutter 340 performing that extraction is removing mineral from the ground on which the AFC 215 will be positioned on the next pass. If the position of the floor cutter 340 does not change from one shearer pass to the next (i.e., as the shearer 300 advances forward through the mineral seam 217), the pitch angle of the shearer 300 should remain approximately the same from one shearer pass to the next because the floor cutter 340 continues to cut across the same, or approximately the same, ground level. However, if the position of the floor cutter 340 changes, either by raising or lowering the floor cutter 340, the pitch angle of the shearer 300 will soon also change when the AFC 215 advances over this ground just cut by the floor cutter 340. Additionally, seam irregularities and other factors may cause the angle of the ground beneath the AFC 215 to have an unexpected or undesirable angle toward or away from the mineral face 216, which would translate to the shearer 300 (supported by the AFC 215), affecting the shearer pitch angle.

For example, if the floor cutter 340 is lowered (i.e., cuts below the bottom of the AFC 215), the floor cutter 340 extracts mineral or material from a portion of the mineral face 216 that is below the current level of the AFC 215. Therefore, when the AFC 215 advances forward, at least the face side portion of the AFC 215 will be positioned on lower ground, which changes the pitch angle of the shearer 300 (e.g., decreases the pitch angle of the shearer 300). Analogously, if the floor cutter 340 is raised (i.e., cuts above the bottom of the AFC 215), the floor cutter 340 leaves (i.e., does not extract) a portion of the mineral face 216 that is above the current level of the AFC 215. Therefore, when the AFC 215 advances forward, at least the face side portion of the AFC 215 will be positioned on higher ground, which changes the pitch angle of the shearer 300 (e.g., increases the pitch angle of the shearer 300).

Therefore, the current pitch angle of the shearer 300 depends on the ground level that supports the AFC 215, and the future pitch angle of the shearer 300 depends on the vertical position of the floor cutter 340 because the floor cutter 340 carves out, from the mineral face 216, the floor on which the AFC 215 will be advancing over. For example, lowering the floor cutter 340 will decrease the pitch angle of the shearer 300 as the AFC 215 advances, while raising the floor cutter 340 will increase the pitch angle of the shearer 300 as the AFC 215 advances. When the pitch of the shearer is too low, the shearer 300 risks crashing into the mineral face 216 and shutting down. However, when the pitch of the shearer 300 is too high, the shearer 300 may instead tip backward. Therefore, when the pitch of the shearer 300 operates outside of a desired pitch range, the shearer 300 increases the risk of causing downtime, and even damage to the shearer 300 or other parts of the mining system 200 (e.g., the roof support 205). Monitoring the position of the shearer 300 also minimizes down time of the longwall mining system 200 and minimizes the possibility of causing extraction problems such as, for example, degradation of mineral material, deterioration of mineral face alignment, formation of cavities by compromising overlying seam strata, and, in some instances, lack of monitoring may cause damage to the longwall mining system 200.

The roll of the shearer 300 refers to an angular difference between the right side (e.g., the tailgate) of the shearer 300 and the left side (e.g., the maingate) of the shearer 300, as shown in FIG. 8. Positive roll refers to the shearer 300 tilting toward the tailgate while negative roll refers to the shearer 300 tilting toward the maingate and away from the tailgate.

Both the pitch and the roll of the shearer 300 are measured in degrees. A pitch or a roll of zero indicates that the shearer 300 is leveled.

Figure 9:
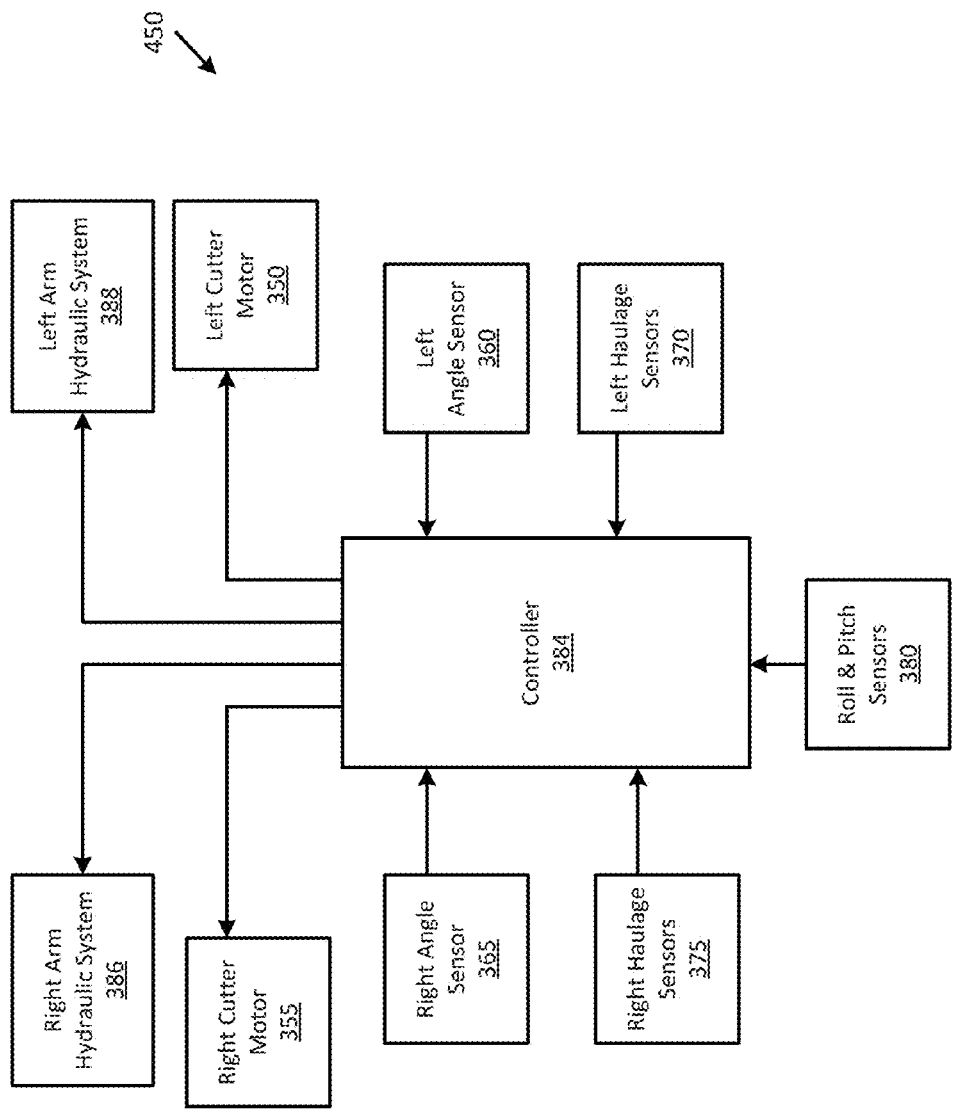
FIG. 9 is a schematic diagram of a controller of the shearer of FIGS. 6A-B.

The sensors 360, 365, 370, 375, 380 provide information to the controller 384 such that the operation of the shearer 300 may remain efficient. As shown in FIG. 9, the controller 384 is also in communication with other systems related to the shearer 300. For example, the controller 384 communicates with the right arm hydraulic system 386 and with the left arm hydraulic system 388. The controller 384 monitors and controls the operation of the hydraulic systems 386, 388 and the motors 350, 355 based on signals received from the various sensors 360, 365, 370, 275, 380. For example, the controller 384 may alter the operation of the hydraulic systems 386, 388 and the motors 350, 355 based on the information received from the sensors 360, 365, 370, 375, 380.

Figure 10:
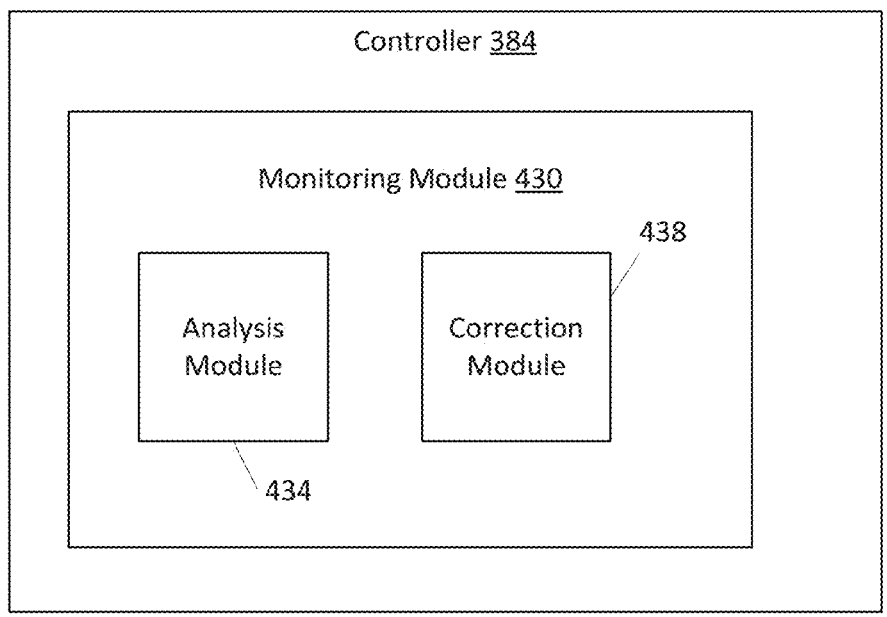
FIG. 10 is a schematic diagram of a monitoring module of the longwall mining system.
Figure 11:
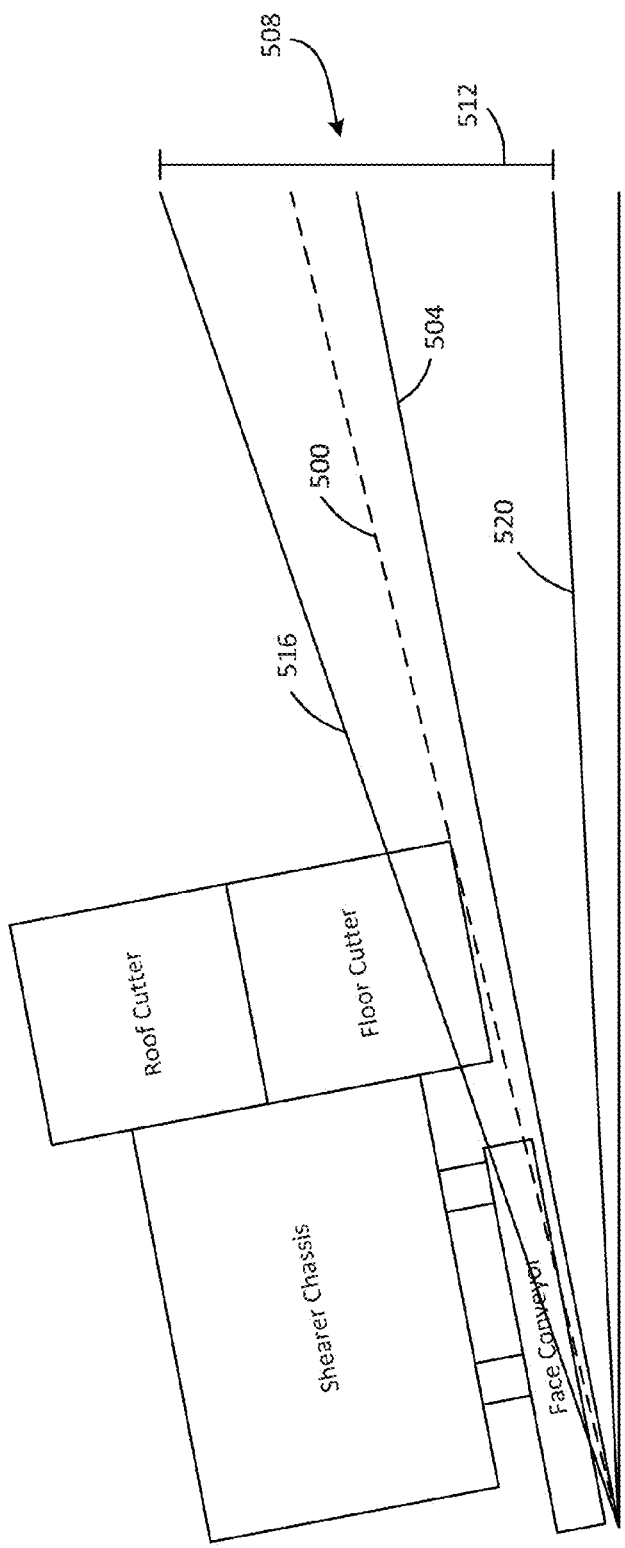
FIG. 11 is a schematic diagram illustrating the monitoring thresholds for the shearer of the longwall mining system.

In particular, the controller 384 monitors pitch data related to the shearer 300 and controls the position of the cutters 335, 340 based on the pitch position of the shearer 300. As shown in FIG. 10, the controller 384 includes a monitoring module 430 that monitors the shearer position data obtained through the sensors 360, 365, 370, 375, 380. The monitoring module 430 includes an analysis module 434 that receives the position data, which includes information regarding the position of the shearer 300, and compares the position of the shearer 300 with a desired shearer position. For example, as shown in FIG. 11, the analysis module 434 compares the current pitch angle 500 of the shearer 300 to a desired pitch angle 504 and a desired pitch angle range 508. The monitoring module 430 also includes a correction module 438 that controls the operation of the shearer 300 and implements a corrective action such that the pitch position of the shearer approaches the desired shearer pitch position.

In some embodiments, the controller 384 also monitors and controls other operations and parameters of the shearer 300. For example, in some embodiments, an initial cutting sequence (e.g., a pass along the mineral face 216) and extraction heights (e.g., heights of the cutters 335, 340) are defined by use of an offline software utility, which is then loaded on to the shearer control system as a cutting profile. Once the shearer controller 384 has access to the initial cutting sequence and the extraction heights, the controller 384 controls the shearer 300 such that the shearer 300 automatically replicates the pre-defined cutting profile until conditions in the mineral seam 217 change. When seam conditions change, an operator of the shearer 300 may override control of the cutters 335, 340 while the controller 384 records the new roof/floor horizon as a new cutting profile.

Additionally, the cutting profile may define different cutter heights for different sections along the mineral face 216. For reference purposes, the mineral face 216 may be divided up into sections based on roof supports. For a simple example, the longwall system may include one hundred roof supports along the mineral face 216, and the cutting profile for a single shearer pass may specify cutter heights every ten roof supports. In this example, ten different cutter heights, one for each section of ten roof supports, would be included in a cutting profile for a single shearer pass to define the cutter heights for the entire wall. The size of the sections (i.e., the number of roof supports per section) may vary depending on the desired precision and other factors.

Figure 12:
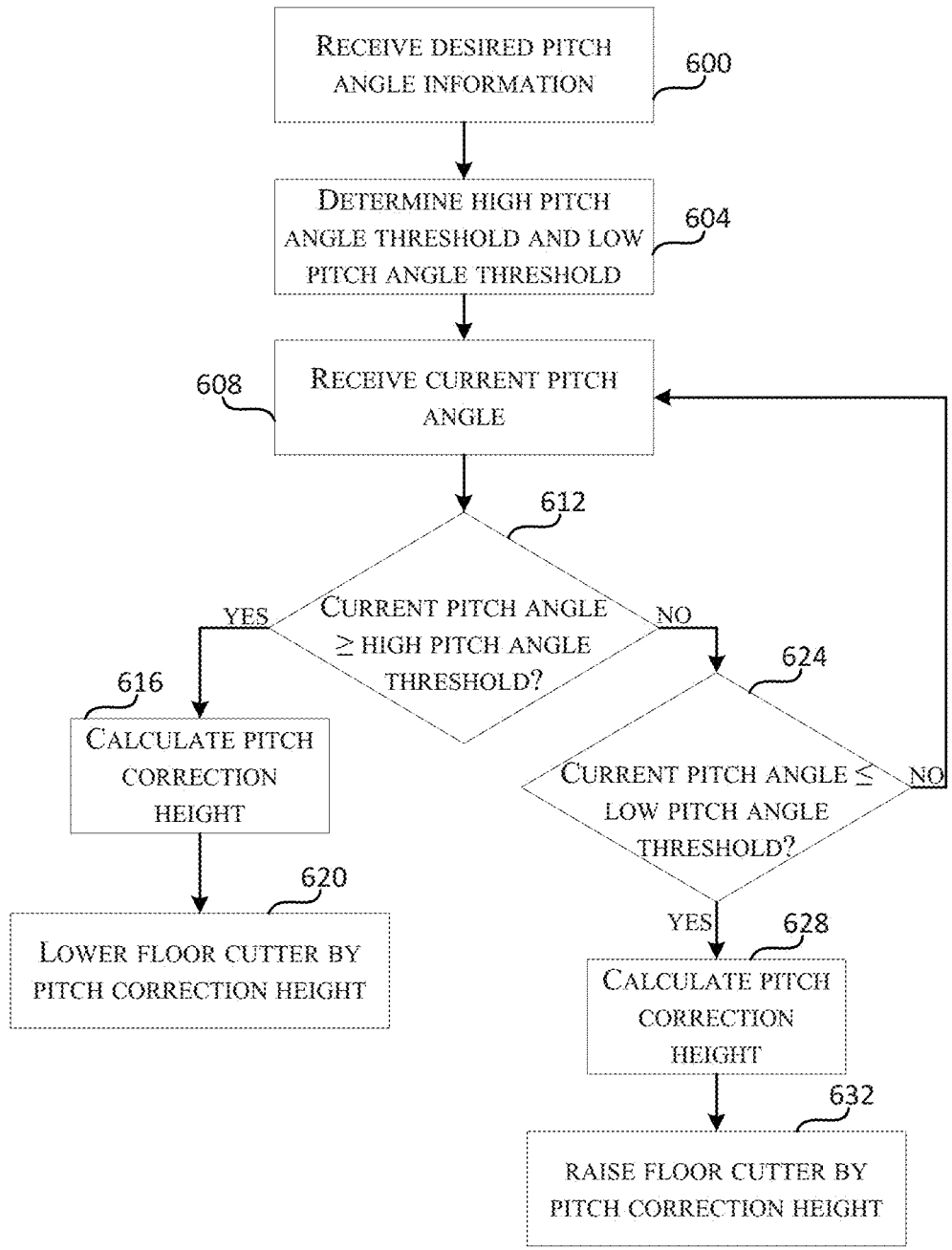
FIG. 12 is a flowchart illustrating a method of monitoring a pitch shearer position.

FIG. 12 illustrates a method implemented by the analysis module 434 and the correction module 438 to maintain the shearer 300 operating within desired pitch position parameters. As shown in FIG. 12, the analysis module 434 first receives pitch angle information (block 600). The pitch angle information is electronic data received from, for example, an operator or user manually inputting data (e.g., via a keyboard, mouse, touch screen, or other user interface), mineral seam modeling software providing the data, data output by a real-time mineral seam monitoring system, a remote supervisor/operator outside of the mine site (e.g., via the remote monitoring system 400), a combination thereof, or another source. The pitch angle information includes or is used to calculate a range of desirable pitch angles, which may be defined by a high threshold and a low threshold.

In some instances, the pitch angle information received takes the form of a desired pitch angle 504 and a desired pitch angle tolerance 512. For example, a user may measure a desired pitch angle 504 at the mine site based on the alignment of the mineral seam 217, and determine an appropriate pitch angle tolerance 512 for the application based on the type of terrain in which the mine is located and the particular shearer 300 operating parameters. The user then inputs the desired pitch angle 504 (e.g., 20°) and the tolerance 512 (e.g., 30°) into the analysis module 434. In some embodiments, at step 600, the user enters some of the pitch angle information, and the analysis module 434 obtains the remainder of the pitch angle information from another source. For example, the user inputs the desired pitch angle 504, but the analysis module 434 accesses the desired pitch angle tolerance 512 from a memory (e.g., of the controller 384 or of the remote monitoring system 400) previously stored at a configuration stage or at the time of manufacture.

After receipt, the analysis module 434 uses the desired pitch angle 504 and the desired pitch angle tolerance 512 to determine a high pitch threshold 516 and a low pitch threshold 520 to define a desired pitch angle range 508 (block 604). To do so, the analysis module 434 first calculates half of the pitch angle tolerance 508. In the illustrated example, half of the example 30° pitch angle tolerance 508 corresponds to 15°. The analysis module 434 then adds half of the pitch angle tolerance 508 to the desired pitch angle 504 to calculate the high pitch threshold 516. In the illustrated example, the high pitch threshold 516 is calculated to be 35° (e.g., 20° plus 15°). To calculate the low pitch threshold 520, the analysis module 434 subtracts half of the pitch angle tolerance 508 from the desired pitch angle 504. In the illustrated example, the low pitch threshold 520 is calculated to be 5° (e.g., 20° minus 15°).

As shown in FIG. 11, due to the calculation of the low pitch threshold 520 and the high pitch threshold 516, the desired pitch angle 504 corresponds to the midpoint between the low pitch threshold 520 and the high pitch threshold 516. The low pitch threshold 520 and the high pitch threshold 516 thereby define the desired pitch angle range 508. In the illustrated example, the desired pitch angle range 508 is 5° to 35°. In some embodiments, the analysis module 434 does not calculate the high pitch threshold 516 and/or the low pitch threshold 520. Rather, the pitch angle information received by the analysis module 434 includes the high pitch threshold 516 and the low pitch threshold 520, in addition to or in place of the desired pitch angle 504 and the desired pitch angle tolerance 512.

The analysis module 434 then receives the current pitch angle 500 from the pitch and roll sensor 380 (block 608). The analysis module 434 proceeds to determine whether the current pitch angle 500 is within the desired pitch angle range 508. To do so, the analysis module 434 determines whether the current pitch angle 500 exceeds the high pitch threshold 516 (block 612). If the analysis module 434 determines that the current pitch angle 500 exceeds the high pitch threshold 516, the correction module 438 proceeds to calculate a pitch correction height (block 616). The pitch correction height indicates a desired vertical position of the floor cutter 340 that will cause the pitch of the shearer 300 to approach the desired pitch angle 504 and/or operate within the desired pitch angle range 508. The correction module 438 determines the pitch correction height by calculating the difference between the current pitch angle 500 and the closest pitch threshold 516, 520, translating the angular change to a change in vertical position of the floor cutter 340 (e.g., −0.5 m), and determining the desired vertical position of the floor cutter 340 (e.g., 0 m, down from the current vertical position of 0.5 m).

In the illustrated example, when the current pitch angle 500 exceeds the high pitch threshold 516, the correction module 438 calculates the difference between the current pitch angle 500 and the high pitch threshold 516, and translates that to a change in vertical position of the floor cutter 340 (e.g., −0.5 m). The correction module 438 then determines the desired vertical position of the floor cutter 340 corresponding to the change in vertical position needed to induce the calculated change in pitch angle. For example, the correction module 438 may determine that to bring the pitch angle of the shearer 300 within the desired pitch angle range 508, the floor cutter 340 should be moved to a desired vertical position of, for example, 0 m, down from the current vertical position of 0.5 m. The correction module 438 communicates with the left arm hydraulic system 388 to change the vertical position of the floor cutter 340 such that the left arm hydraulic system 388 lowers the floor cutter 340 to the pitch correction height (e.g., the desired vertical position of the floor cutter 340) at block 620. Once the floor cutter 340 is lowered and the AFC 215 is advanced forward, the pitch angle of the shearer 300 decreases on the next pass and begins operating within the desired pitch angle range 508. The analysis module 434 then continues to monitor the pitch angle of the shearer 300 (block 608).

If, on the other hand, the analysis module 434 determines that the current pitch angle 500 does not exceed the high pitch threshold 516, the analysis module 434 proceeds to determine if the current pitch angle 500 is below the low pitch threshold 520 (block 624). If the analysis module 434 determines that the current pitch angle 500 is below the low pitch threshold 520, the correction module 438 proceeds to calculate the pitch correction height. In this instance, the correction module 438 determines the pitch correction height by calculating the difference between the current pitch angle 500 and the low pitch threshold 520, translating the angular difference to a necessary change in height, and determining the desired vertical position of the floor cutter 340. The correction module 438 communicates with the left arm hydraulic system 388 to change the vertical position of the floor cutter 340 such that the left arm hydraulic system 388 raises the floor cutter 340 to the pitch correction height (block 632). Once the floor cutter 340 is raised to the desired vertical position of, for example, 1 m, and the AFC 215 advances forward, the pitch angle of the shearer 300 also increases on the next pass and begins operating within the desired pitch angle range 508. The analysis module 434 then continues to monitor the pitch angle of the shearer 300 (block 608). If, on the other hand, the analysis module 434 determines that the current pitch angle 500 is not below the low pitch threshold 520 (i.e., the current pitch angle 500 is within the desired pitch angle 508), the analysis module 434 simply continues to monitor the current pitch angle 500 with respect to the desired pitch angle range 508 and the position of the floor cutter 340 is not changed.

In general, the more the current pitch angle 500 exceeds the high pitch threshold 516, or is below the low pitch threshold 520, the larger the necessary change in vertical position of the floor cutter 340 to correct the pitch angle of the shearer 300. However, due to the physical dimensions of the shearer 300 (e.g., the length of the cutter arms 315, 320) and the AFC 215 (e.g., the depth of the AFC 215), the cutters 335, 340 may be restricted to a maximum vertical height, for example, 3 m, and a minimum vertical height, for example, −1.0 m. Therefore, the desired vertical positions of the floor cutter 340 do not exceed the maximum vertical height or the minimum vertical height. In other words, even if the correction module 438 calculates the desired vertical position of the floor cutter 340 to be either above the maximum vertical height or below the minimum vertical height, the correction module 438 will determine that the desired vertical position in those situations is equal to the maximum vertical height or the minimum vertical height, as appropriate. In such instances, however, even after the floor cutter 340 is moved to the desired vertical position, the change in vertical position may not be sufficient to bring the shearer 300 into the desired pitch angle 504. Therefore, in such instances, the pitch angle for the shearer 300 may require more than one pass to correct the pitch angle 500.

The pitch angle detection and corrective action relies in part on the floor cutter 340 trailing the main body of the shearer 300. In other words, it relies in part on the floor cutter 340 being positioned on the end of the shearer 300 opposite the direction of travel during shearing. Accordingly, when the controller 384 determines that the current pitch angle 500 is outside of the desired pitch angle range 508, the floor cutter 340 has not yet sheared mineral away from the section of the mineral face 216 in front of the (excessively-pitched) shearer 300. This arrangement allows the controller 384 to determine if the current pitch angle 500 is within the desired pitch angle range 508, and adjust the vertical position of the trailing floor cutter 340, as appropriate, before the floor cutter 340 reaches the relevant section of the mineral face 216. In such embodiments, the controller 384 continuously monitors the current pitch angle 500 of the shearer 300 and takes corresponding corrective action (lowering/raising the floor cutter 340) during a single shearer pass. Before the next shearer pass, the AFC 215 advances forward over the surface that was just sheared with the pitch angle correction techniques. Then, on the next shearer pass, the pitch angle correction is at least partially realized by the shearer 300, because the AFC 215 is located on the just-sheared surface.

The pitch angle of the shearer 300, however, may operate outside the desired pitch angle range 508 in some sections of the mineral face 216 and operate inside the desired pitch angle range 508 in other sections of the mineral face 216. Therefore, the controller 384 may change the vertical position of the floor cutter 340 more than once during a single shearer pass. For instance, in one example, the controller 384 determines that the current pitch angle 500 exceeds the high pitch angle threshold 516, and lowers the floor cutter 340. The current pitch angle 500 continues to exceed the high pitch angle threshold 516 for, e.g., twenty-five roof supports. Then, the current pitch angle 500 decreases and the shearer 300 operates within the desired pitch angle range 508. In turn, the controller 384 stops the corrective action by bringing the floor cutter 340 back to its original vertical position or its programmed position. This step of setting the floor cutter 340 to its original or programmed vertical position, while not shown in FIG. 12, would occur after detecting that the current pitch angle 500 is within the desired pitch angle range 508 (a "no" decision in step 624) and before returning to step 608. The pitch angle 500 may again be outside of the desirable pitch angle range 508 further along the mineral face 216. For instance, the current pitch angle 500 may trend below the low pitch threshold, and the controller 384 will then take corrective action by raising the floor cutter 340.

Although the steps in FIG. 12 are shown as occurring serially, one or more of the steps are executed simultaneously. For example, the analyzing steps of FIG. 12 may occur simultaneously such that all conditions are checked. Therefore, the controller 384 inhibits the shearer 300 to operate at an inadequate pitch angle and provides corrective action to automatically change the position of the floor cutter to impact the pitch angle of the shearer 300. The controller 384 may also monitor and control other operations and/or characteristics of the shearer 300, such as, for example, the speed of the cutters 335, 340, the roll angle, the position of the cutters 335, 340 independent of the pitch of the shearer 300, and the like. Although FIG. 11 illustrates pitch angle thresholds that are both positive values, in some embodiments, one or both of the pitch threshold is/are negative (e.g., −5°).

With reference to the comparisons between the current pitch angle 500 and the pitch angle thresholds 516, 520, "exceeding" means greater than, or means greater than or equal to, and "below" means less than, or means less than or equal to.

Figure 13:
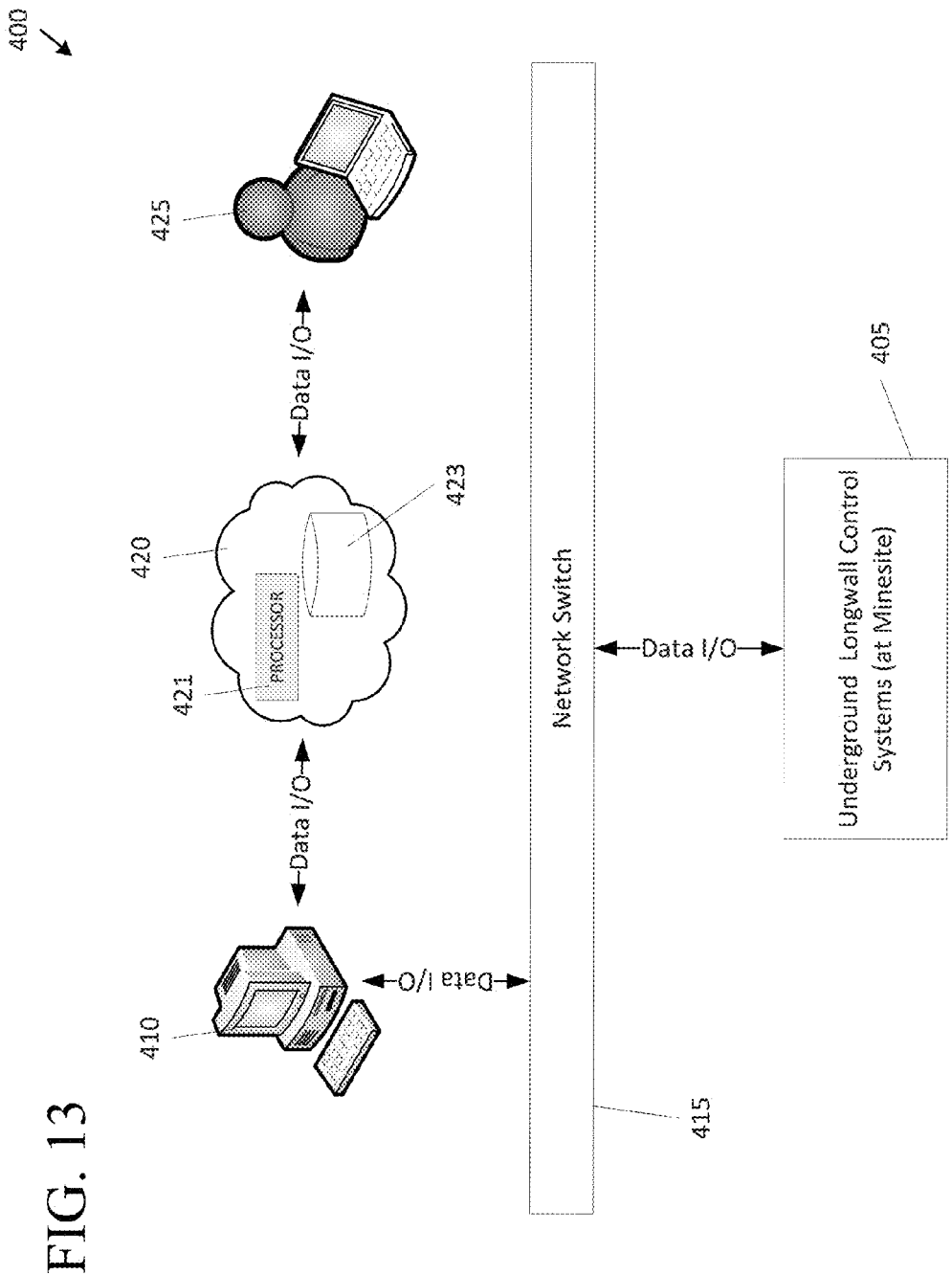
FIG. 13 is a schematic diagram of the health monitoring system of the extraction system shown in FIG. 1.
Figure 14:
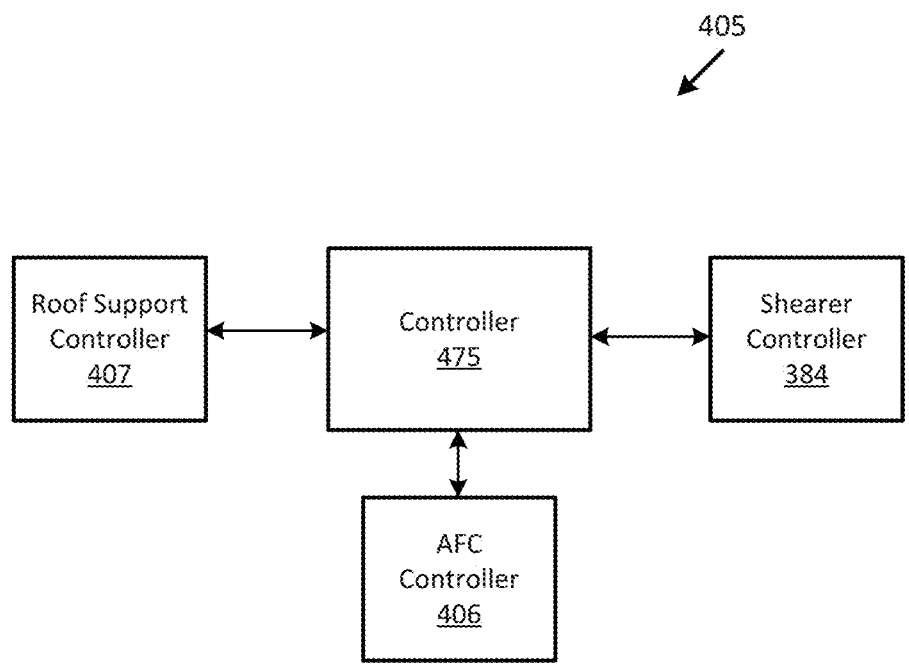
FIG. 14 is a schematic diagram of the longwall control system of the health monitoring system of FIG. 13.

The extraction system 100 also includes a health monitoring system 400 that monitors general operation of the longwall system 200. As shown in FIG. 13, the health monitoring system 400 includes longwall control system 405, a surface computer 410, a network switch 415, a monitoring system 420, and a service center 425. In the illustrated embodiment, the longwall control systems 405 are located at the mine site. The longwall control system 405 includes various components and controls for the components of the longwall mining system 200. For example, the longwall control system 405 may include various components and controls for the shearer 300, the roof supports 205, the AFC 215, and the like. As shown in FIG. 14, the longwall control systems 405 include a main controller 475 configured to be in communication with the shearer controller 384, an AFC controller 406, and a roof support controller 407. In other embodiments, the longwall control systems 405 are configured such that the main controller 475 communicates directly with sensors and systems relevant to the AFC 215, the roof support 205, and the shearer 300. In such embodiments, the shearer controller 384 may be omitted and the sensors 360, 365, 370, 375, 380, the hydraulic systems 386, 388, and the cutter motors 350, 355 communicate directly with the main controller 475.

As shown in FIG. 13, the longwall control systems 405 are in communication with the surface computer 410 via the network switch 415, both of which can also be located at the mine site. Data from the longwall control system 405 is communicated to the surface computer 410, such that, for example, the network switch 415 receives and routes data from the controller 475 and/or the individual control systems of the shearer 300, the roof supports 205, and the AFC 215. The surface computer 410 is in further communication with a remote monitoring system 420, which can include various computing devices and processors 421 for processing data received from the surface computer 410 (such as the data communicated between the surface computer 410 and the various longwall control systems 405), as well as various servers 423 or databases for storing such data. The remote monitoring system 420 processes and archives the data from the surface computer 410 based on control logic that can be executed by one or more computing devices or processors 421 of the remote monitoring system 420. The particular control logic executed at the remote monitoring system 420 can include various methods for processing data from each mining system component (i.e., the roof supports 205, the AFC 215, shearer 300, and the like). The remote monitoring system 420 applies stored rules and algorithms to the data received from the surface computer 410 to determine if the longwall system 200 operates within specified parameters. If the remote monitoring system 420 determines that the longwall system 200 does not operate within specified parameters, the remote monitoring system 420 may flag the occurrence as an event and generate an alert. In some embodiments, the remote monitoring system 420 may communicate with the service center 425 to notify the service center 425 of the operation of the longwall system 200. A user can also contact the service center 425 directly to inquire about a specific longwall system 200.

Each of the components of the health monitoring system 400 is communicatively coupled for bi-directional communication. The communication paths between any two components of the health monitoring system 400 may be wired (e.g., via Ethernet cables or otherwise), wireless (e.g., via a WiFi®, cellular, Bluetooth® protocols), or a combination thereof. Although only an underground longwall mining system 200 and a single network switch 415 is depicted in FIG. 13, additional mining machines both underground and surface-related (and alternative to longwall mining) may be coupled to the surface computer 410 via the network switch 415. Similarly, additional network switches 415 or connections may be included to provide alternate communication paths between the underground longwall control systems 405 and the surface computer 410, as well as other systems. Furthermore, additional surface computers 410, remote monitoring systems 420, and service centers 425 may be included in the health monitoring system 400.

As explained above, the controller 475 receives information regarding the various components of the longwall mining system 200. The controller 475 can aggregate the received data and store the aggregated data in a memory, including a memory dedicated to the controller 475. Periodically, the aggregated data is output as a data file via the network switch 415 to the surface computer 410. From the surface computer 410, the data is communicated to the remote monitoring system 420, where the data is processed and stored according to control logic particular for analyzing data aggregated since the previous data file was sent. The aggregated data may also be time-stamped based on the time the sensors 360, 365, 370, 375, 380 and other sensors from the longwall system 200 obtained the data. The data can then be organized based on the time it was obtained. For example, a new data file with sensor data may be sent every three minutes. The data file includes sensor data aggregated over the previous three minute window. In some embodiments, the time window for aggregating data can corresponds to the time required to complete one shearer cycle. In some embodiments, the controller 475 does not aggregate data, but rather the controller 475 sends data as it is received in real-time. In such embodiments, the remote monitoring system 420 is configured to aggregate the data as it is received from the controller 475. The remote monitoring system 420 can then analyze the shearer data based on stored aggregated data, or based on horizon control data received in real-time from the controller 475.

Figure 15:
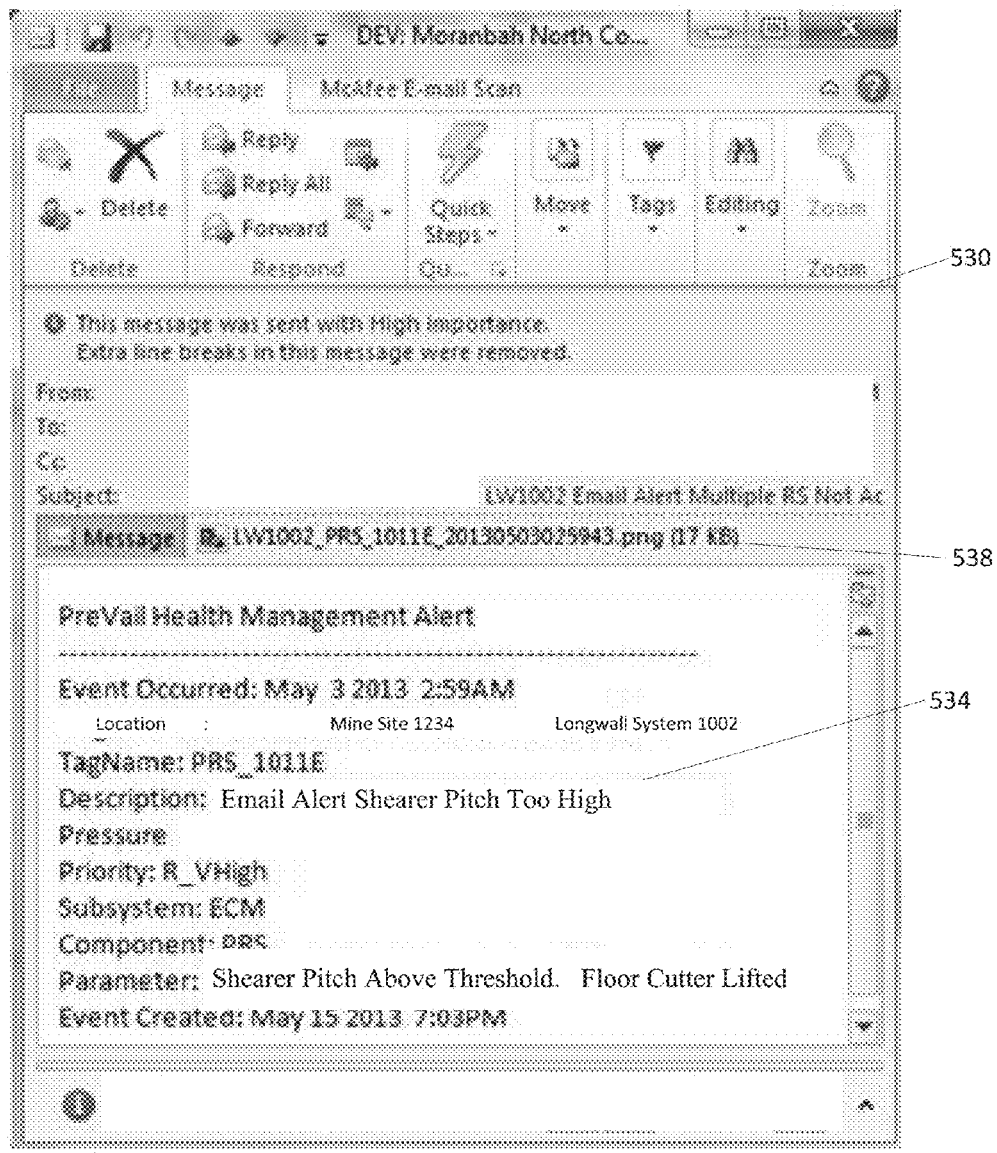
FIG. 15 illustrates an exemplary e-mail alert.

In some embodiments, the remote monitoring system 420, in particular the remote processor 421, also generates an alert or alarm when the shearer 300 operates outside of specified parameters. For example, the alarm or alert may include general information about the event including, for example, when the event occurred, a location of the event, an indication of the parameter associated with the event (e.g., shearer pitch angle and floor cutter position), and when the event/alert was created. The alert can be archived in the remote monitoring system 420 or exported to the service center 425 or elsewhere. For example, the remote monitoring system 420 can archive alerts that are later exported for reporting purposes. The alert may take several forms (e.g., e-mail, SMS messaging, etc.). In the illustrated embodiment, the alert is an e-mail message as shown in FIG. 15. In the illustrated embodiment, the e-mail alert 530 includes text 534 with general information about the alert. In some embodiments, the e-mail alert 530 may also include an attached image file 538. In the illustrated embodiment, the attached image file 538 is a Portable Network Graphic (.png) file, including a graphic depiction of the operation of the shearer 300 as the shearer 300 shears mineral from the mineral face 216.

It should be understood that while the controller 384 of the shearer 300 was described as performing the functionality with regard to monitoring the pitch position of the shearer 300, in some embodiments, the health monitoring system 400 monitors the pitch position of the shearer 300 and sends instructions to the shearer 384 regarding the change in position of the floor cutter 340. In such embodiments, the controller 384 of the shearer 300 may serve to route information to the longwall control system 405 and then to the remote monitoring processor 421. The remote monitoring processor 421 then executes the method shown in FIG. 12, and sends instructions back to the controller 384 to change the position of the floor cutter 340 in a specified manner.

In yet other embodiments, the longwall controller 475 performs the monitoring of the pitch position of the shearer 300. Again, in such embodiments, the controller 384 of the shearer 300 routes data from the sensors 360, 365, 370, 375, 380 to the longwall controller 475. The longwall controller 475 determines the corrective action (i.e., if the position of the floor cutter 340 needs to change) and sends instructions to the controller 384 of the shearer 300 to change the position of the floor cutter 340, if needed. In yet other embodiments, the controller 384 of the shearer 300 may be omitted, and the health monitoring system 400, for example, the longwall controller 475, the remote monitoring processor 421, or a combination thereof, monitor the pitch position of the shearer as described with respect to FIGS. 11 and 12.

It should also be noted that the remote monitoring system 420 may run analyses described with respect to the pitch angle, as well as other analyses, whether these analyses are conducted on horizon data or other longwall component system data. The analyses can be executed by either the processor 421 or another designated processor of the health monitoring system 400. For example the remote monitoring system 420 may run analyses on monitored parameters (collected data) from other components of the longwall mining system 200. In some instances, for example, the remote monitoring system 420 performs other analyses on data collected form the sensors 360, 365, 370, 375, 380 and generates alerts. Such alerts can include detailed information regarding a situation that triggers the alert.

Thus, the invention provides, among other things, systems and method for monitoring the pitch angle of a shearer in a longwall mining system. Various features and advantages of the invention are set forth in the following claims.

What is claimed is:

1. A method of monitoring a longwall shearing mining machine in a longwall mining system, the shearing mining machine including a shearer having a cutter drum, the method comprising:
   obtaining, by a processor, desired pitch angle information for the shearer;
   receiving, by the processor, a pitch angle indicative of a current pitch position of the shearer;
   determining, by the processor, whether the pitch angle is within a desired pitch angle range, the desired pitch angle range based on the desired pitch angle information, the desired pitch angle range including a high pitch angle threshold and a low pitch angle threshold; and
   controlling, by the processor, a position of the cutter drum based on whether the pitch angle is within the desired pitch angle range;
   wherein controlling the position of the cutter drum includes changing a vertical position of the cutter drum based on a difference between the pitch angle and at least one selected from a group consisting of the high pitch angle threshold and the low pitch angle threshold.

2. The method of claim 1, wherein the desired pitch angle information includes at least one selected from a group consisting of a desired pitch angle and a desired pitch angle tolerance.

3. The method of claim 1, wherein controlling the vertical position of the cutter drum includes at least one selected from a group consisting of lowering the position of the cutter drum when the pitch angle exceeds the high pitch angle threshold and raising the position of the cutter drum when the pitch angle is below the low pitch angle threshold.

4. The method of claim 1, wherein determining whether the pitch angle is within the desired pitch angle range includes comparing, by the processor, the pitch angle to at least one selected from the group consisting of the high pitch angle threshold and the low pitch angle threshold.

5. The method of claim 1, further comprising calculating, by the processor, a pitch correction height based on a difference between the pitch angle and the at least one selected from the group consisting of the high pitch angle threshold and the low pitch angle threshold, and wherein controlling the position of the cutter drum includes at least one selected from the group consisting of lowering and raising the cutter drum based on the pitch correction height.

6. The method of claim 1, wherein obtaining desired pitch angle information includes receiving, by the processor, a desired pitch angle, and calculating, by the processor, at least one selected from the group consisting of the high pitch angle threshold and the low pitch angle threshold using the desired pitch angle and a desired pitch angle tolerance, wherein the desired pitch angle range is defined by the at least one selected from the group consisting of the high pitch angle threshold and the low pitch angle threshold.

7. The method of claim 1, wherein obtaining desired pitch angle information includes receiving, by the processor, at least one selected from the group consisting of the high pitch angle threshold and the low pitch angle threshold, wherein the desired pitch angle range is defined by the at least one selected from the group consisting of the high pitch angle threshold and the low pitch angle threshold, and wherein determining whether the pitch angle is within a desired pitch angle range includes comparing, by the processor, the pitch angle to the at least one selected from the group consisting of the high pitch angle threshold and the low pitch angle threshold.

8. The method of claim 1, wherein the cutter drum is a floor cutter drum used to cut a lower section of a mineral seam, and wherein the shearer further includes a roof cutter drum used to cut an upper section of the mineral seam.

9. A monitoring device for a longwall mining system including a shearer having a cutter drum and a sensor to determine a pitch position of the shearer, the monitoring device including:
 a monitoring module implemented on a processor in communication with the shearer to obtain desired pitch angle information and receive a pitch angle indicative of a current pitch position of the shearer, the monitoring module including:
  an analysis module configured to determine whether the pitch angle is within a desired pitch angle range, the pitch angle range based on the desired pitch angle information, the pitch angle range including a high pitch angle threshold and a low pitch angle threshold; and
  a correction module configured to control a position of the cutter drum based on whether the pitch angle is within the desired pitch angle range
  wherein the correction module is configured to change a vertical position of the cutter drum based on a difference between the pitch angle and at least one selected from the group consisting of the high pitch angle threshold and the low pitch angle threshold.

10. The monitoring device of claim 9, wherein the desired pitch angle information includes at least one selected from a group consisting of a desired pitch angle and a desired pitch angle tolerance.

11. The monitoring device of claim 9, wherein the correction module is configured to lower the position of the cutter drum when the pitch angle exceeds the high pitch angle threshold and raise the position of the cutter drum when the pitch angle is below the low pitch angle threshold.

12. The monitoring device of claim 9, wherein the analysis module is configured to calculate a pitch correction height based on a difference between the pitch angle and the at least one selected from the group consisting of the high pitch angle threshold and the low pitch angle threshold, and wherein the correction module is configured to perform at least one selected from a group consisting of lowering and raising the cutter drum based on the pitch correction height.

13. The monitoring device of claim 9, wherein the analysis module is configured to compare the pitch angle to at least one selected from the group consisting of the high pitch angle threshold and the low pitch angle threshold to determine whether the pitch angle is within the desired pitch angle range.

14. The monitoring device of claim 9, wherein the monitoring module is configured to receive a desired pitch angle; calculate at least one selected from the group consisting of the high pitch angle threshold and the low pitch threshold using the desired pitch angle and a desired pitch angle tolerance, wherein the desired pitch angle range is defined by the at least one selected from the group consisting of the high pitch angle threshold and the low pitch angle threshold.

15. The monitoring device of claim 9, wherein the monitoring module is configured to receive at least one selected from the group consisting of the high pitch angle threshold and the low pitch angle threshold, wherein the desired pitch angle range is defined by the at least of the high pitch angle threshold and the low pitch angle threshold, and wherein the analysis module compares the pitch angle to the at least one selected from the group consisting of the high pitch angle threshold and the low pitch angle threshold to determine whether the pitch angle is within the desired pitch angle range.

16. The monitoring device of claim 9, wherein the cutter drum is a floor cutter drum used to cut a lower section of a mineral seam, and wherein the shearer further includes a roof cutter drum used to cut an upper section of the mineral seam.

17. A longwall mining system comprising:
 a shearer including
  a shearer body,
  a cutter drum coupled to the shearer body,
  a sensor coupled to the shearer body and configured to determine a pitch position of the shearer body; and
 a processor coupled to the shearer, the processor configured to
  obtain desired pitch angle information for the shearer,
  receive, from the sensor, a pitch angle indicative of a current pitch position of the shearer body,
  determine whether the pitch angle is within a desired pitch angle range, the desired pitch angle range based on the desired pitch angle information, the desired pitch angle range including a high pitch angle threshold and a low pitch angle threshold, and
  control a position of the cutter drum by changing a vertical position of the cutter drum based on a difference between the pitch angle and at least one selected from a group consisting of the high pitch angle threshold and low pitch angle threshold.

18. The longwall mining system of claim 17, wherein the processor is configured to control the position of the cutter drum by lowering the position of the cutter drum when the pitch angle exceeds the high pitch angle threshold and raising the position of the cutter drum when the pitch angle is below the low pitch angle threshold.

19. The longwall mining system of claim 17, wherein the processor is configured to calculate a pitch correction height based on a difference between the pitch angle and the at least one selected from the group consisting of the high pitch angle threshold and the low pitch angle threshold, and wherein the processor is configured to perform at least one selected from the group consisting of lowering and raising the cutter drum based on the pitch correction height.

* * * * *